United States Patent [19]

Borne et al.

[11] Patent Number: 4,802,725
[45] Date of Patent: Feb. 7, 1989

[54] OPTO-ELECTRONIC CONNECTION DEVICE

[75] Inventors: André Borne; Marcel Jusseau, both of Villeurbanne, France

[73] Assignee: Cgee Alsthom, Levallois-Perret, France

[21] Appl. No.: 411,723

[22] Filed: Aug. 25, 1982

[30] Foreign Application Priority Data

Aug. 28, 1981 [FR] France .................. 81 16427

[51] Int. Cl.$^4$ .......................... G02B 6/36; G02B 7/26
[52] U.S. Cl. ................................. 350/96.20
[58] Field of Search ............... 350/96.20, 96.21, 96.22

[56] References Cited

U.S. PATENT DOCUMENTS 3,790,791 2/1974 Anderson ............................ 250/227
4,140,367 2/1979 Makuch et al. .................. 350/96.21
4,373,778 2/1983 Adham ............................. 350/96.20

*Primary Examiner*—William L. Sikes
*Assistant Examiner*—Robert E. Wise
*Attorney, Agent, or Firm*—Sughrue, Mion, Zinn, Macpeak, and Seas

[57] ABSTRACT

The device comprises a parallelpipedal junction block (10A) with opening onto one of its surfaces a respective channel (11A) each housing one of a plurality of opto-electronic components (9). The junction block further comprises a single groove (12A) opening onto the opposite surface and a support member (13A) and a sealing member (14A) superposed one on the other in the groove. The support members and the sealing members each have a channel aligned with each channel of the junction block, to accommodate respective optical fibers (4) to connect to the opto-electronic components. Each fiber which is fitted with a terminal (5) with a collar (5') intermediate its ends. A metal sleeve (17A) with resilient longitudinal tongues (18A) is fitted in each channel of the support member to lock the fiber in position by snap-action engagement of the tongues under the collar.

5 Claims, 2 Drawing Sheets

OPTO-ELECTRONIC CONNECTION DEVICE

BACKGROUND OF THE INVENTION

1. Field of the invention

The present invention relates to an optoelectronic connection device, sometimes known as a transmission head, defined by the association of one or more opto-electronic components, such as light-emitting diodes or photodiodes, with respective optical fibers transmitting the light signal output by or incident upon the opto-electronic component to which it is optically connected.

2. Description of the prior art

In a manner known per se, the opto-electronic components used in the terminating circuits of optical transmission systems are mounted by soldering on a printed circuit board on which are generally also mounted by soldering various passive and active components constituting a hybrid amplification circuit connected electrically to the opto-electronic components. The end of the optical fiber to be optically connected to each opto-electronic component is disposed perpendicular to the sensitive surface of the opto-electronic component and may be attached thereto by bonding using a suitable resin. Independently of such bonding, it is necessary to provide mechanical retention of the end of the optical fiber relative to the opto-electronic component to which it is connected; this mechanical retention of the end of the fiber relative to the opto-electronic component concerned may be effected by disposing the board carrying the terminal circuit in a casing with a cover through which each fiber passes and which is equipped with means for retaining each fiber at the point where it passes through the cover.

This optical connection technique requires equipment at each aperture in the cover corresponding to each respective opto-electronic component and as a result of this the final stage in the implementation of terminal circuits is time-consuming and costly.

A principal object of the present invention is to avoid these disadvantages, to facilitate the optical connection between an opto-electronic component and its fiber, and to provide an optical connection which is mechanically robust while involving no risk of damage while being made or released.

SUMMARY OF THE INVENTION

The present invention consists in a device for connecting at least one opto-electronic component adapted to be mounted on a printed circuit board to an optical fiber fitted with a connecting terminal having a flange intermediate its ends, said device comprising at least one junction block of generally parallelepipedal shape, within said junction block and opening onto one of its surfaces a respective channel for each opto-electronic component, a single groove within said junction block and opening onto the opposite surface, into the bottom of which each of said channels opens, a support member and a sealing member superposed one on the other in said groove and each having a channel axially aligned with each channel of said junction block, and a metal sleeve with internally directed resilient longitudinal tongues equipping each of said channels of said support member, whereby each optical fiber, disposed in a respective pair of channels of said support member and said sealing member, is positioned relative to the corresponding opto-electronic component and locked in position under the ends of said resilient longitudinal tongues to effect the optical connection therebetween.

Other objects and advantages will appear from the following description of an example of the invention, when considered in connection with the accompanying drawings, and the novel features will be particularly pointed out in the appended claims.

DESCRIPTION OF THE PREFERRED EMBODIMENTS

Figure 1:
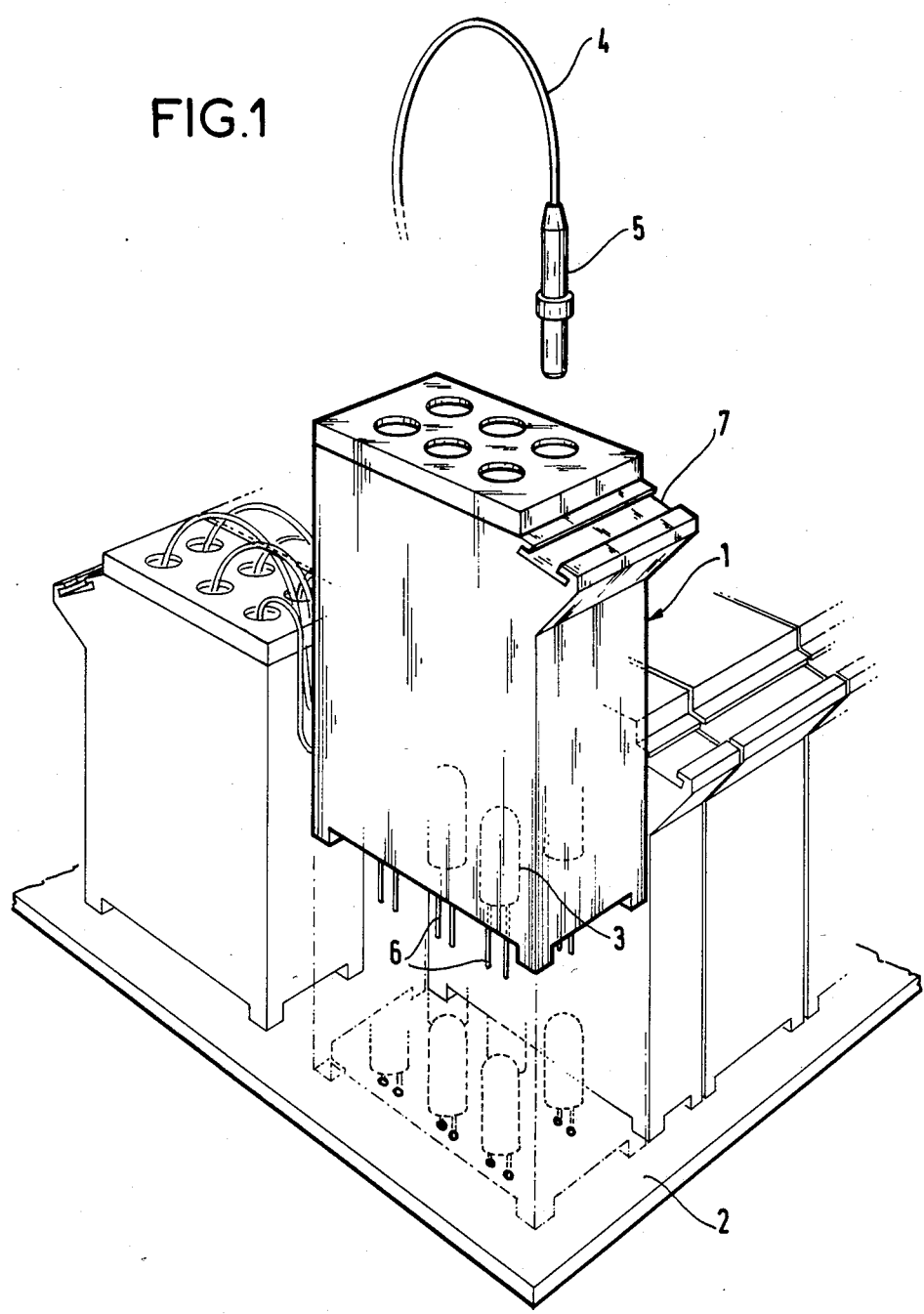
FIG. 1 is a partial view in perspective of a portion of a multiple module device in accordance with the invention.

FIG. 1 shows an opto-electronic head comprising a number of modular units 1 mounted on a printed circuit board 2, these units being soldered or adapted to be soldered to printed circuit board 2 in order to constitute an opto-electronic head in accordance with the invention. These modular units are of generally parallelepipedal shape and provide for the optical connection of opto-electronic components 3, such as photodiodes or light-emitting diodes, housed within them to respective optical fibers 4, the end of each of which is fitted with a terminal 5 and also housed within the unit. Although not shown explicitly in FIG. 1, certain of the modular units may also provide for the electrical connection of an electrical conductor to a pin or tag soldered to printed circuit board 2 and connected by a printed circuit path to active or passive components mounted on the printed circuit board and constituting hybrid amplification circuits associated with the opto-electronic components. It will thus be understood that each modular unit is formed with internal channels which open onto two opposite surfaces, hereinafter referred to as the top and bottom surfaces, and from which exit on the bottom surface side the electrical connection leads 6 of the opto-electronic components or pins (not shown) to be soldered into metal-plated holes in printed circuit board 2. From the top surface side exit the optical fibers such as fiber 4 connected to components 3 or electrical conductors (not shown).

Each modular unit may advantageously comprise on its top surface a laterally projecting strip 7 serving to identify the connections made through the unit.

The various types of modular unit forming the opto-electronic head will be described in greater detail with reference to FIGS. 2, 3 and 4. According to the connections made, these modular units are designated as follows: "dual optical connection module", this being the unit designated 1A in FIG. 2 and providing for the connection of two rows of opto-electronic components 3 to respective optical fibers 4; or "single optical connection module", this being the unit designated 1B in FIG. 3 and providing for the connection of a single row of opto-electronic components 3 to respective fibers 4; or "dual optical-electrical connection module", this being the unit designated 1C in FIG. 4 and providing for the connection of a row of opto-electronic components 3 to respective optical fibers 4 and also for the connection of a row of conductive pins 8 to electrical conductors 9 fitted with terminals 10.

In the following description of these three types of connecting module, parts which are identical or similar will be designated by the same reference numeral, to which the letter A, B or C will be suffixed according to the module described.

Each connecting module comprises a junction block 10A, 10B or 10C defining the external body of the module and having internally, over its full height, a plurality of channels 11A, 11B or 11C and 11'C disposed in one or two rows, as appropriate, and opening onto its bottom surface, as well as a single groove 12A, 12B or 12C which opens onto its top surface and into the bottom of which each of the aforementioned plurality of channels opens. Each of channels 11A, 11B and 11C constitutes a housing for an opto-electronic component and for the end part of the terminal 5 on the optical fiber to be connected, the internal profile of this housing being shown only schematically here but serving to mechanically retain the component 3 it accommodates. Each channel 11'C constitutes a housing for a conductive pin 8 and for the end part of the terminal 10 on the electrical conductor 8 to be connected.

The groove 12A, 12B or 12C opening onto the top surface of each junction block is equipped with a support member 13A, 13B or 13C and a sealing member 14A, 14B or 14C superposed one on the other, projecting slightly above the groove and each having a plurality of channels such as 15A, 15B or 15C and 16A, 16B or 16C, respectively, corresponding in number and position to channels 11A, 11B and 11C.

The channels in the support member are each equipped with a metal sleeve 17A, 17B, 17C or 17'C having resilient longitudinal tongues 18A, 18B, 18C or 18'C extending inwardly of the channel, their ends being disposed adjacent the inlet to the corresponding channel 11A, 11B, 11C or 11'C. Sleeves 17A, 17B, 17C butt up against an internal shoulder formed in the channels in the support member, extending between this shoulder, which is at the end adjacent the sealing member, and the bottom of the groove in the junction block at the periphery of channels 11A, 11B, 11C therein. Sleeve 17'C projects beyond channel 15C which accommodates it, its external end portion co-operating with a conductive peripheral ring 19 disposed between support member 13C and the edge of channel 11'C, to which is externally soldered the slightly bent end of conductive pin 8.

This external end portion of sleeve 17'C has two tangs (not visible in the figure) bent inwardly and constituting a contact spring, and also, opposed to these tangs, a longitudinal slot into which is inserted an internal tongue 19' of ring 19.

The sealing member 14A, 14B or 14C is of an elastic material such as neoprene. It has or defines internal retaining members 24A, 24B or 24C over the length of its channels.

The support member and the sealing member are maintained in the groove in junction block 1A, 1B or 1C by means of a cover 20A, 20B or 20C bonded or engaged by means of a snap action to the edges of the slot, the cover being formed with openings for the terminals on fibers 4 or conductors 9 to be inserted in their respective housings.

The sheathed optical fibers 4 and conductors 9 are fitted with respective terminals 5 and 10 so as to cooperate with the connecting modules. These terminals 5 and 10 each have a collar 5' and 10' intermediate the ends, forwardly of which the length of the end part is defined in relation to the distance separating the ends of longitudinal tongues 18A, 18B, 18C of opto-electronic component 3 or pin 8 and ring 19.

Thus to make the optical connection between one of opto-electronic components 3 housed in its channel and the corresponding optical fiber, the terminal 5 on the fiber inserted into its housing is locked in position by butting up against the perimeter of the housing for the opto-electronic component and by the snap-action engagement of the ends of the resilient longitudinal tongues of the sleeve with which the housing is fitted under the intermediate collar on the terminal. In this locked position, the end of the fiber, which is flush with the front surface of the terminal, is virtually in contact with the sensitive surface of the opto-electronic component, in order to secure the necessary optical transmission.

To connect conductive pin 8 mounted with terminal ring 19 in its housing electrically to the corresponding electrical conductor 9, terminal 10 on the conductor inserted into its housing is locked in position by snap-action engagement of the ends of the tongues of the sleeve fitted in the housing under intermediate collar 10' on the terminal; in this position the end part of the terminal is urged forcefully against the internal tongue of ring 19 and the opposed tangs of the sleeve so as to bring about the necessary electrical contact.

Figure 2:
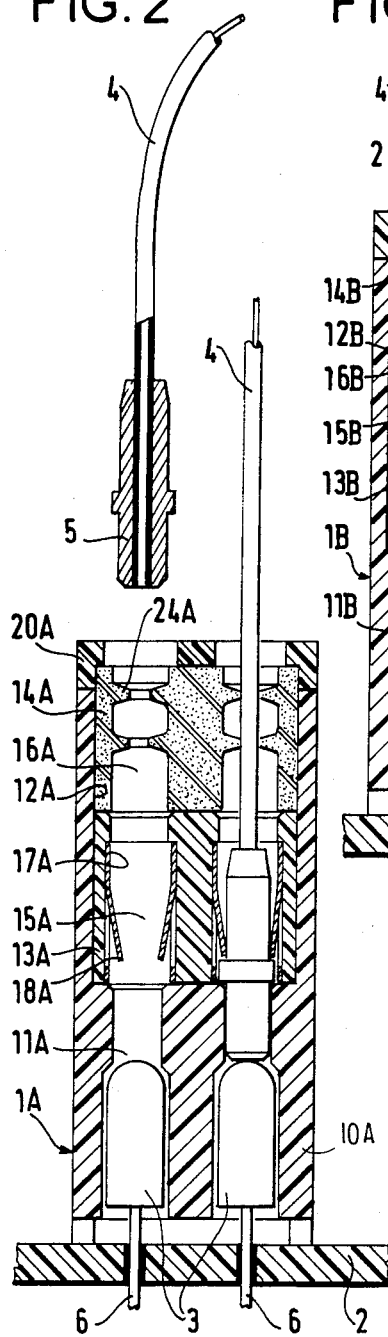
FIG. 2 is a partial cross-section, partially exploded, of a portion of the dual optical connection module of the device shown in FIG. 1.
Figure 3:
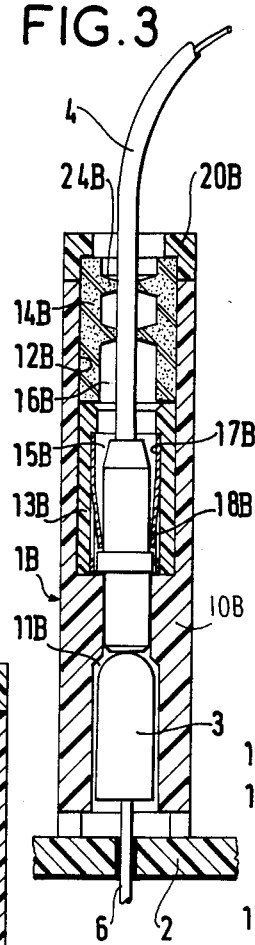
FIG. 3 is a partial cross-section through a single optical connection module of a portion of the device shown in FIG. 1.
Figure 4:
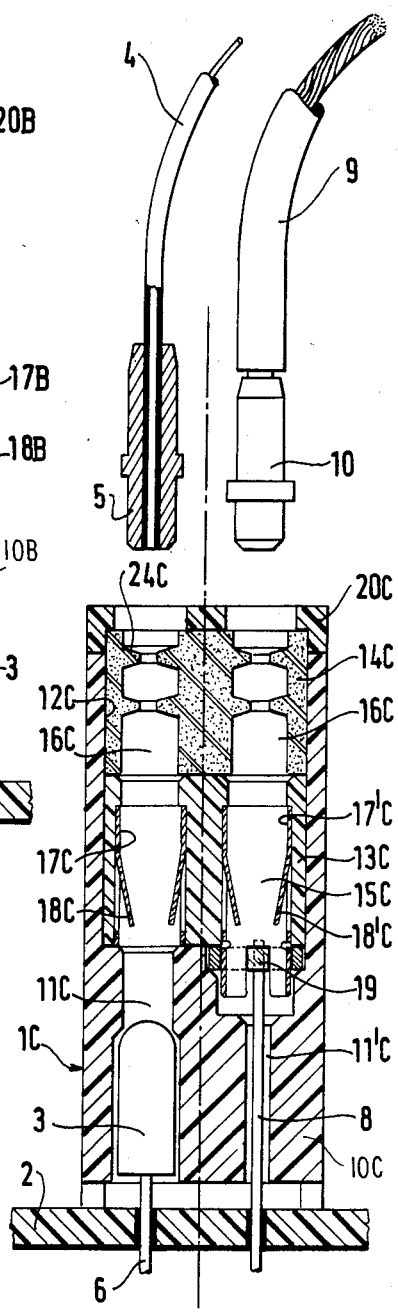
FIG. 4 is a partial cross-section, partially exploded, through a portion of the dual optical-electrical connection module of the device shown in FIG. 1.

FIGS. 2 to 4 also show the leads 6 of opto-electronic components 3 and the ends of pins 8 soldered into metal-plated holes in printed circuit board 2.

Using this optical head, the optical and electrical connections are advantageously made and released by means of a special tool which fits over terminal 5 or 10 and moves apart resilient longitudinal tongues 18A, 18B, 18C on insertion into and withdrawal from the modular connection unit. Thus connection is a quick and simple operation, notably without any risk of damage to the optical fiber, simultaneously ensuring a high mechanical retaining force of the optical fiber in engagement with the opto-electronic component to which it is connected.

It will be understood that various changes in the details, materials and arrangements of parts, which have been herein described and illustrated in order to explain the nature of the invention, may be made by those skilled in the art within the principle and scope of the invention as expressed in the appended claims.

It is claimed:

1. A transmission head for connecting at least one opto-electronic component mounted on a printed circuit board to an optical fiber fitted with a connecting terminal having a radially enlarged flange intermediate of its ends, said transmission head comprising:
   at least one junction block of generally parallelepipedal shape and forming top and bottom surfaces,
   at least one channel extending the full height of said junction block from said top surface to said bottom surface and opening onto said bottom surface and being sized at its bottom end to receive and house an opto-electronic component mounted on said printed circuit board,
   a single groove within said junction block from said top surface downwardly to peripherally enlarge a portion of the channel above said opti-electronic component, a hollow support member and a hollow sealing member in end abutment positioned in inverse order within said groove so as to form internally a channel axially aligned with the channel of said junction block, and a metal sleeve fixedly mounted internally of said hollow support member and having internally directed resilient longitudinal tongues such that an optical fiber projecting downwardly through said hollow sealing member and said hollow support member, in that order, has said radially enlarged flange positioned below said internally directed resilient longitudinal tongue to lock said optical fiber connecting terminal to said junction block under the ends of said resilient longitudinal tongue and to thereby effect an optical connection between the end of said connecting terminal and said opto-electronic component within said channel in end abutting fashion.

2. A transmission head according to claim 1, wherein said sealing member comprises an elastic material and its channel is formed of an internal radially projecting retaining member having an opening smaller than that of said optical fiber connecting terminal which elastically deform during passage of the connecting terminal therethrough, whereby said internal retaining member engages the optical fiber to seal the channel in the direction of the top surface of the junction block.

3. A transmission head according to claim 1, further comprising a cover fixed to the junction block and overlying the end of said sealing member to lock said sealing member and said support member in position in said groove of said junction block.

4. A transmission head according to claim 1, wherein said at least one channel comprises a second channel extending the full height of said junction block and opening to the top and bottom surfaces, said second channel accommodating a conductive pin soldered to said printed circuit board and projecting upwardly into said bottom of said second channel, said second channel including a groove within said junction block from the top surface downwardly and forming a shoulder, said second channel bearing within said groove, in order from the top surface downwardly, a sealing member superimposed over a support member, said support member and said sealing member within said second channel being hollow, a metal sleeve with internally directed resilient longitudinal tongues within the channel of said support member, each of said support member and said sealing member for said second channel, in turn, having channels aligned axially with each of said pin-accommodating channels, each of said pin-accommodating channels of said support member being equipped with a sleeve having resilient longitudinal tongues internally of said channel and an end part external to said channel forming a contact spring adapted for engaging an electrical conductor projecting into said second channel and through said hollow sealing member and support member, said electrical conductor being equipped with a terminal having a radially enlarged collar intermediate of its ends, said resilient longitudinal tongues having ends contacting said collar to maintain said electrical conductor terminal in position to link said pin and said conductor.

5. A transmission head according to claim 4, further comprising a ring sized to said groove and underlying the end of said support member and engaging said shoulder, and wherein said ring further comprises an internal tongue connected to said pin with said ring mounted on the external part of said sleeve forming said contact spring.

* * * * *